Aug. 16, 1960 A. RIEDEL 2,949,033
APPARATUS FOR INDICATING UNBALANCE OF ROTATING BODIES
Filed Oct. 22, 1954 2 Sheets-Sheet 1

INVENTOR
ALBRECHT RIEDEL

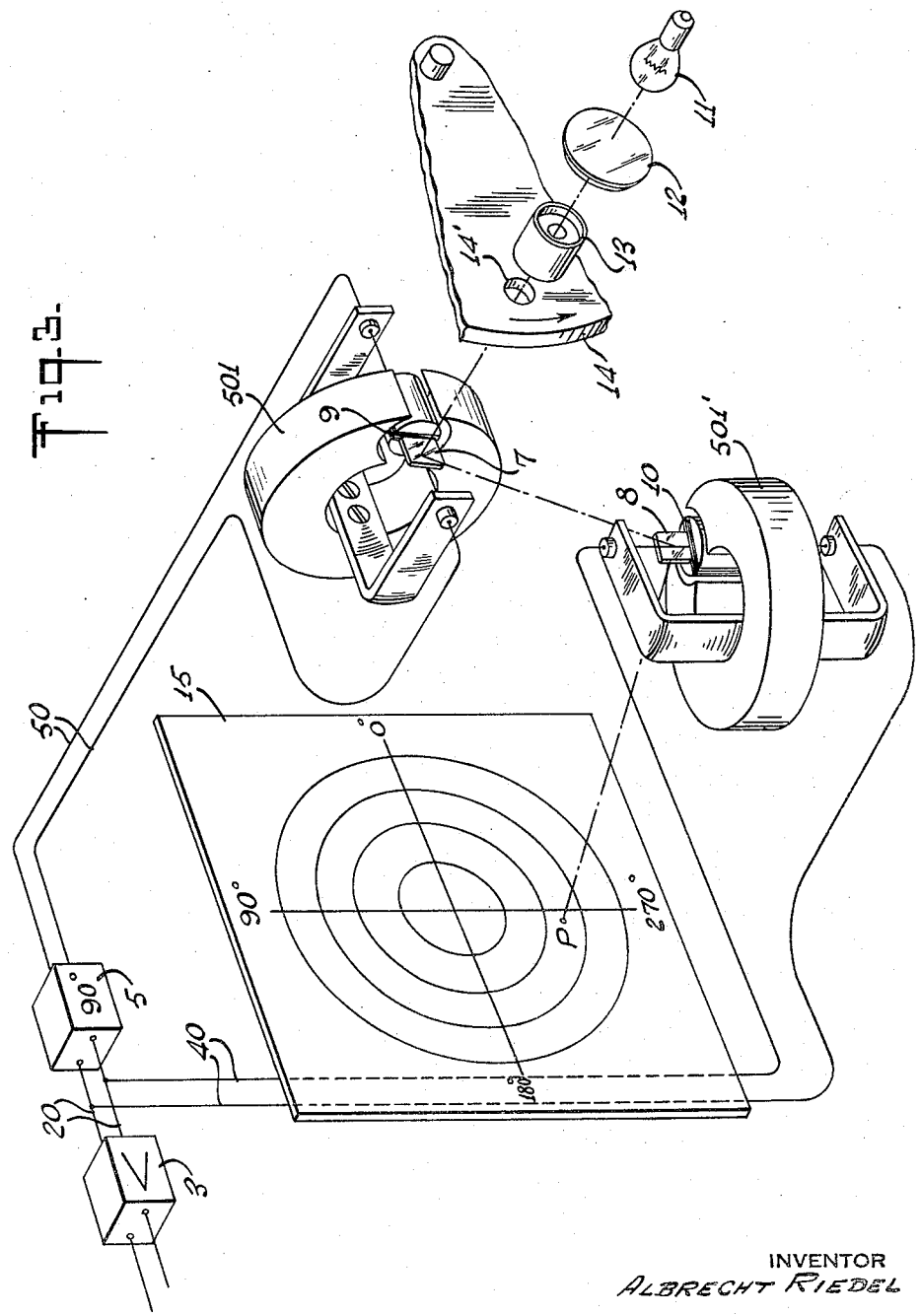

United States Patent Office 2,949,033
Patented Aug. 16, 1960

2,949,033

APPARATUS FOR INDICATING UNBALANCE OF ROTATING BODIES

Albrecht Riedel, Kleinmachnow, near Berlin, Germany, assignor to VEB Gerate- und Regler-Werke Teltow, Teltow, near Berlin, Germany Filed Oct. 22, 1954, Ser. No. 464,130

Claims priority, application Germany Mar. 25, 1954

3 Claims. (Cl. 73—462)

My invention relates to improvements in the balancing of rotating masses.

It is an object of the invention to provide an improved apparatus for visually indicating the magnitude and location of the unbalance of rotating bodies.

It is another object of the invention to provide an improved electro-optical device for simultaneously indicating the magnitude and location of the unbalance of rotating bodies.

Other objects and structural details of the invention will be apparent from the following description when read in conjunction with the accompanying drawings forming part of this specification, wherein:

Fig. 3 is a fragmentary perspective view of the device illustrated in Fig. 2.

Following the uses of electric engineering alternating magnitudes will here be designated as alternating fields and a rotating magnitude will be designated as a rotary field.

As is known, alternating fields arise when at a fixed location in space a physical magnitude varies with time. By composing alternating fields of different angular positions, rotary fields are produced the field variation of which at a fixed location depends on the shift in respect of location and phase and on the ratios of amplitudes and frequencies.

If an unbalanced body mounted to be able to vibrate in a plane is rotated, it generates an alternating field in the plane of vibration, because the amplitude of the vibrations in this plane produced by the centrifugal forces varies with the time. In a suitable design it is possible by the same forces to produce other alternating fields of other phase angles, equality of frequencies being assured as the generating forces are identical. It is possible to choose at will not only the phase angles between the alternating fields but also the ratio of their amplitudes.

In order to obtain a circular form of the rotary field which is the most suitable for balancing methods, it is necessary to derive from the vibrations of the unbalanced body two alternating fields of equal amplitudes, the phases of which are separated 90 degrees as to location and phase, and to superimpose these alternating fields, wherein, as already mentioned, equality of both frequencies is assured.

Various physical quanities can be used for producing these alternating fields. The vibrations of the unbalanced body can be used immediately for producing the rotary field. Or these vibrations may be converted in other quantities, for example electric voltages, pneumatic or hydraulic pressures and these quantities may be used instead of the vibrations. As the relation between the amplitudes of the generated quantities and the generating quantities are defined and can be maintained also after said conversion and after their composition with other quantities, the magnitude of the rotary field, or the radius of the circular rotary field are also a measure of the magnitude of the unbalance. The ratio of the indicated to the generating quantity can be found by computing as well as by a calibrating step.

Figure 1:
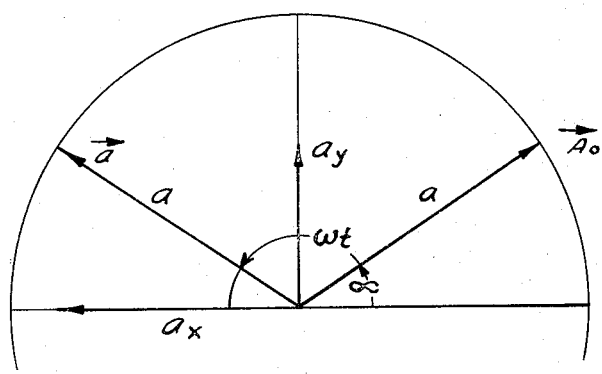
Fig. 1 is a vector diagram illustrating the principles underlying the present invention.

The problem of composing two alternating fields with 90 degrees phase separation as to location and time to form a rotary field is to be solved mathematically with reference to the vector diagram of Fig. 1.

The following equations correspond to the two alternating fields:

$$a_x = a \cos(\omega t + \alpha) \quad (1)$$
$$a_y = ja \sin(\omega t + \alpha) \quad (2)$$

By means of Euler's formula $$e^{j\varphi} = \cos \varphi + j \sin \varphi$$

we find the sum of both alternating fields $$\vec{a} = a \cos(\omega t + \alpha) + ja \sin(\omega t + \alpha)$$
$$\vec{a} = a e^{j(\omega t + \alpha)} \quad (3)$$

where $a =$ the amplitude
$\alpha =$ the phase angle at a given time
$\omega =$ the angular velocity
$t =$ the time The term (3) defines the movement of a point on a circular path with the radius $a$.

Equation 3 may be rearranged $$\vec{a} = a e^{j\alpha} e^{j\omega t} \quad (4)$$

By substituting $$a e^{j\alpha} = \vec{A_0} \quad (5)$$

we have the final equation:

$$\vec{a} = \vec{A_0} e^{j\omega t}$$

$\vec{A_0}$ is the zero vector, i.e. the vector at the time $t = 0$, $2n\pi$.

From the preceding equations it results that two alternating fields having equal amplitudes and a 90 degrees separation as to location and phase render the end point of the resulting vector $(\vec{a})$ to rotate on a circular path, its absolute value equaling the amplitude $a$. It equals the generating amplitude and therefore is proportional to the unbalance and shows the variation of the endpoint of the vector on a fixed location.

The location of the unbalance is found by means of an auxiliary magnitude modulating either the rotary field itself or the means controlled by it. In some cases it is preferable to produce the rotary field by an auxiliary magnitude and to use the magnitude of unbalance for modulation.

A defined angle appearing in the modulated rotary field is attached to the modulating quantity. In an extreme case the modulating quantity is arranged to act only at a distinct time $t = t_0$ such that the zero-vector $$\vec{a} = a e^{j\alpha}$$

can be measured immediately.

One can imagine the following cases:

(a) The rotary field is generated by the physical quantity from which the unbalance can be determined; the auxiliary magnitude is used for defining the location of the phase.

(b) The rotary field is generated by an auxiliary magnitude and the location of the phase is defined by means of the physical quantity from which the unbalance can be determined.

(c) A combination of both preceding methods; as for producing the rotary field two magnitudes are necessary, the rotary field is generated by means of the physical quantity by which the unbalance can be determined, and the auxiliary magnitude.

In the following, one embodiment of the apparatus according to my invention will be described by way of illustrating the above principles, reference being had to the drawings.

Figure 2:
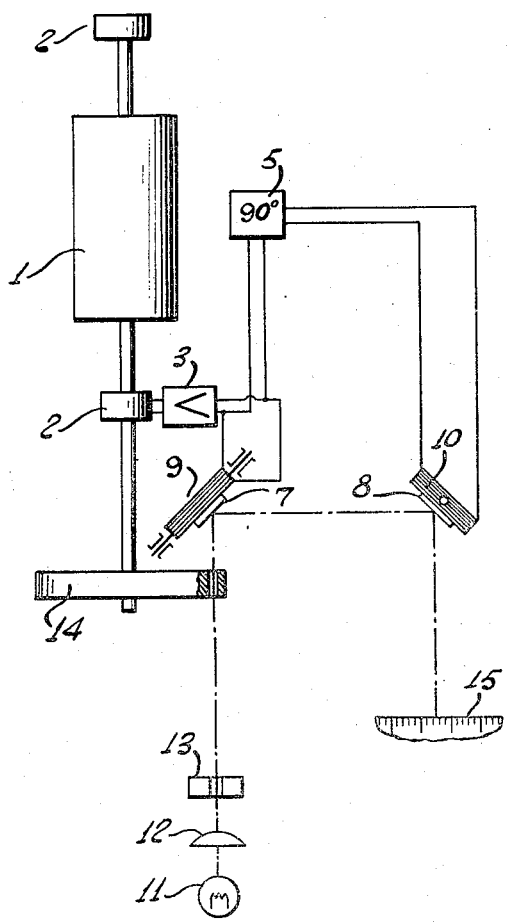
Fig. 2 is a schematic plan view of one embodiment of a device constructed in accordance with the present invention.

Referring specifically to Figs. 2 and 3, it will be seen that the unbalanced body 1 is mounted on members 2 able to vibrate in a plane. When body 1 rotates while unbalanced, centrifugal forces arising with the rotation produce vibrations of the members 2; their frequencies depend on the velocity of rotation and their amplitude on the magnitude of unbalance. This equality of frequencies and proportionality of amplitudes to the magnitude of unbalance is maintained during the converting of the vibrations by the transducer type members 2 in any suitable manner, for example capacitively, inductively or piezo-electrically, into electric oscillations, and the amplifying of these oscillations by means of an amplifier 3 of any suitable construction. The output voltage of the amplifier is fed by means of conductors 20 to a phase shifting device 5 which is so constructed (in a manner well known to the art and thus requiring no specific illustration) as to produce an output voltage which is 90° out of phase with the output voltage of the amplifier 3. The two output voltages, i.e., that of the amplifier 3 and that of the phase shifter 5, are applied via conductors 40 and 50, respectively, to a pair of oscilloscope coils 9 and 10 arranged for rotary swinging movement about perpendicular axes. The coils 9 and 10 carry mirrors 7 and 8, respectively, which are also arranged at right angles to one another, thereby being adapted to produce alternating fields. The coils are disposed in the fields of a pair of magnets 501 and 501', respectively, and thus oscillate with a 90° phase difference due to the 90° phase difference between the voltages applied to the coils.

The electric alternating fields are transformed into optical alternating fields by means of the mirrors 7 and 8 which swing or oscillate together with the coils 9 and 10. This transformation is brought about by the fact that a light beam emitted by a light source 11 and passing through a condenser 12, a fixed aperture member 13, and an aperture 14' in a movable but otherwise imperforate shutter member 14 is reflected from the mirror 7 while the same is executing its swinging movements in essentially a vertical plane, i.e., about an essentially horizontal axis. The mirror 8 thus receives a substantially plane bundle of rays from the mirror 7. Inasmuch as the mirror 8 also forms an optical alternating field, the respective alternating optical fields of the two mirrors are superimposed one on the other and combined or composed into an optical rotary field. Theoretically, the envelope of the rays reflected from the mirror 8 has the form of a cone. The image screen 15 is disposed at right angles to the axis of this cone. Accordingly, the line of intersection between the assumed light cone and the screen surface is a circle.

The shutter member 14 is arranged to rotate in synchronism with the test body 1, so that during each revolution thereof only a single light ray is transmitted through the shutter aperture 14'. Since the frequency of rotation of the shutter member 14 is the same as the oscillation frequency of the mirrors 7 and 8, this single light ray is always incident on and reflected by the mirrors in the same position of the latter relative to the shutter member, whereby the major part of the aforesaid circle is blanked out so as to form on the screen 15 only a stationary light point P. The position of the point P thus corresponds to the position of the unbalance on the test body, while the distance between the point P and the center of the screen is a measure of the magnitude of the unbalance.

It will be understood that the principles of the present invention are capable of being implemented by systems other than that described hereinabove. Merely by way of example, the two output voltages of the amplifier 3 and phase shifter 5 can be applied, respectively, to the pairs of deflection plates or coils of a cathode ray oscilloscope. This will produce a rotary field in the oscilloscope tube causing the cathode ray passing the rotary field to depict a circular Lissajou figure on the image screen, since frequencies and amplitudes of both alternating fields are equal. Consequently the diameter of the Lissajou figure is proportional to the quantity of unbalance. By means of amplifier 3 the ratio of the amplitudes of the mechanical and electrical oscillation and thereby the diameter of the Lissajou figure can be adjusted within wide limits, either by providing several amplifier steps or by a potentiometer attached to the amplifier. In this manner the amplification can be varied either gradually or stepwise or gradually in various steps.

The alternating fields may also be produced by pneumatic or hydraulic pressures, inasmuch as the displacements of a vibrating body can be readily converted into pressure variations. Such alternating fields may also be composed, for example, by means of mirrors as shown in Figs 2 and 3, the 90° phase shift being obtained by two correspondingly shifted vibrating members.

With respect to any of the foregoing systems, it must be remembered that only one plane of unbalance has been considered, since the explanations apply also for any other bearing and it is always easy to decide which systems are to be arranged singly or doubly when alternately balancing the masses in two planes. The same holds true whenever balancing is to be performed simultaneously in two planes, which may be advantageous for reducing the overall time required for balancing the body. In such a case, a double cathode ray oscilloscope may be employed in lieu of two single oscilloscopes.

As will be noted from the foregoing description of an apparatus for visually indicating the magnitude and location of the unbalance of a rotating body, alternating magnitudes are produced by means of a physical quantity from which the unbalance can be determined and of at least one auxiliary quantity. The alternating magnitudes are composed to form a rotating magnitude and this rotating magnitude or the means controlled by it are modulated. Such alternating magnitudes may be physical quantities such as displacements, accelerations, velocities, momenta, pressures, electric voltages and currents, and others more.

In a known method for ascertaining the magnitude of the unbalance of a rotating body and for simultaneously indicating its location two mirror wattmeters displaced 90 degrees are needed, to which electric currents are applied produced by centrifugal forces arising on the unbalanced body. By my invention the device for indicating the magnitude and location of the unbalance of rotating bodies is simplified and the manner of indicating the values and location of unbalance is improved.

I have described preferred embodiments of my invention, but it is understood that this disclosure is for the purpose of illustration and that various omissions or changes in shape, proportion and arrangements of parts, as well as the substitution of equivalent elements for those herein shown and described may be made without departing from the spirit and scope of the invention as set forth in the appended claims.

What I claim is:

1. Apparatus for indicating the unbalance of a rotary body, comprising means for supporting said body for rotation about an axis, said supporting means being arranged for swinging movement in a direction substantially transverse to said axis of rotation, means responsive to swinging movement of said supporting means for generating an alternating energy field having frequency and phase characteristics proportional to said swinging movement, means for shifting the phase of a portion of said alternating energy field 90° relative to the phase of the remainder of said alternating energy field, an indicating screen provided with a reference mark, a pair of mirrors arranged perpendicularly to one another and adapted to be oscillated about perpendicular axes, a source of light emitting a stationary light beam toward one of said mirrors for deflection by the same to the other of said mirrors and by the latter to said screen, respective means responsive to the phase-shifted portion of said alternating energy field and to the unshifted remainder of said alternating energy field for oscillating said mirrors about said axes in such a manner that said stationary light beam if uninterrupted would form a circular trace on said screen, and shutter means rotatable in synchronism with said body and located intermediate said light source and said one mirror, said shutter means being provided with an eccentrically located aperture to permit only periodic passage of said stationary light beam to said one mirror, thereby blocking all of the potential circular trace except for a single light spot the position of which relative to said reference mark indicates the magnitude and location of said unbalance of said body.

2. Apparatus according to claim 1, said responsive means comprising means for generating an alternating electric current to constitute said alternating energy field, said phase-shifting means being connected to the output of said generating means, said oscillating means comprising a pair of coils each arranged in a respective magnetic field and each carrying a respective one of said mirrors, one of said coils being connected to the output of said generating means, and the other of said coils being connected to the output of said phase-shifting means.

3. Apparatus for indicating the unbalance of a rotary body, comprising means for rotatably supporting said body at respective locations spaced along the axis of rotation of said body, said supporting means being arranged for swinging movement substantially in parallel planes oriented transversely to said axis of rotation, transducer means responsive to swinging movement of said supporting means for generating an alternating physical quantity having frequency and phase characteristics proportional to said swinging movement, means for amplifying said alternating physical quantity, means for shifting the phase of a portion of the amplified alternating physical quantity 90° relative to the phase of the remainder of said amplified alternating physical quantity, an indicating screen provided with a reference mark, a pair of mirrors arranged perpendicularly to one another and adapted to be oscillated about perpendicular axes, a source of light emitting a stationary light beam toward one of said mirrors for deflection by the same to the other of said mirrors and by the latter to said screen, respective means responsive to the phase-shifted portion of said alternating physical quantity and to the unshifted remainder of said alternating physical quantity for oscillating said mirrors about said axes in such a manner that said stationary light beam if uninterrupted would form a circular trace on said screen, and shutter means rotatable in synchronism with said body and located intermediate said light source and said one mirror, said shutter means being provided with an eccentrically located aperture to permit only periodic passage of said stationary light beam to said one mirror, thereby blocking all of the potential circular trace except for a single light spot the position of which relative to said reference mark indicates the magnitude and location of said unbalance of said body.

References Cited in the file of this patent

UNITED STATES PATENTS

| | | |
|---|---|---|
| 2,121,359 | Luck et al. | June 21, 1938 |
| 2,130,122 | Dybvig | Sept. 13, 1938 |
| 2,178,074 | Jakel | Oct. 31, 1939 |
| 2,285,038 | Loughlin | June 2, 1942 |
| 2,461,645 | Kallmann | Feb. 15, 1949 |
| 2,695,516 | Petroff | Nov. 30, 1954 |
| 2,722,830 | Federn et al. | Nov. 8, 1955 |

FOREIGN PATENTS

| | | |
|---|---|---|
| 549,548 | Great Britain | Nov. 26, 1942 |
| 735,803 | Great Britain | Aug. 31, 1955 |